Figure 1:
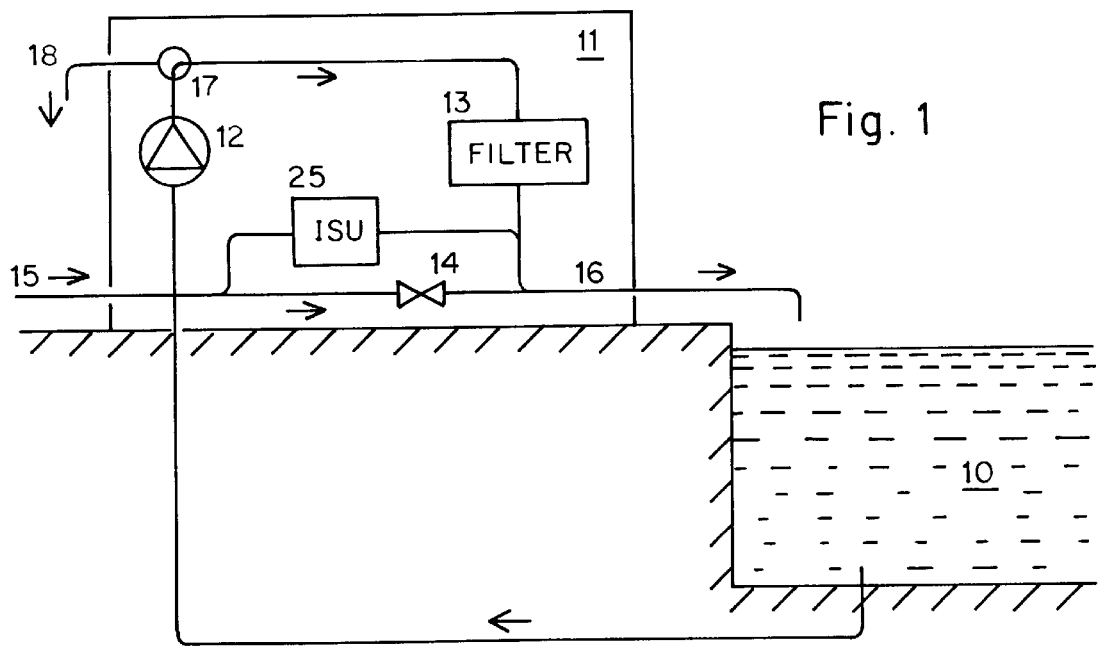

United States Patent [19]
Garvey et al.

[11] Patent Number: 6,017,461
[45] Date of Patent: Jan. 25, 2000

[54] WATER PURIFICATION SYSTEMS

[76] Inventors: Ernest Sydney Garvey, 26 Murray Road, Wokingham, Berks, United Kingdom, RG41 2TB; Randolph Euan Irvine Reid, 6 Cheylesmore Drive, Frimley, Camberley, Surrey, United Kingdom, GU16 5BN

[21] Appl. No.: 08/913,422
[22] PCT Filed: Mar. 15, 1996
[86] PCT No.: PCT/GB96/00641
   § 371 Date: Feb. 23, 1998
   § 102(e) Date: Feb. 23, 1998
[87] PCT Pub. No.: WO96/28390
   PCT Pub. Date: Sep. 19, 1996
[51] Int. Cl.⁷ .................................................. C02F 1/467
[52] U.S. Cl. .................. 210/748; 204/237; 204/248; 204/269; 204/293; 205/745; 205/760; 205/751; 210/764; 210/765; 210/101; 210/169; 210/192; 210/206; 210/253
[58] Field of Search ..................... 204/248, 267, 204/269, 275, 237, 293; 205/745, 751, 760; 210/101, 192, 198.1, 199, 205, 206, 253, 257.1, 748, 764, 765, 169

[56] References Cited

U.S. PATENT DOCUMENTS

| | | |
|---|---|---|
| 674,153 | 5/1901 | Bachman . |
| 3,458,414 | 7/1969 | Crane et al. ........................ 204/149 |
| 3,936,364 | 2/1976 | Middle .................................. 210/192 |
| 4,256,552 | 3/1981 | Sweeney ................................. 204/98 |
| 4,361,471 | 11/1982 | Kosarek ................................ 204/128 |
| 4,381,240 | 4/1983 | Russell ................................ 210/192 |
| 4,492,618 | 1/1985 | Eder .................................... 204/152 |
| 4,525,253 | 6/1985 | Hayes et al. .......................... 204/149 |
| 4,680,114 | 7/1987 | Hayes ................................... 210/192 |
| 4,752,401 | 6/1988 | Bodenstein ............................ 210/746 |
| 4,781,805 | 11/1988 | Dahlgren .............................. 204/149 |
| 4,935,116 | 6/1990 | Le Mire ................................ 204/237 |
| 4,936,979 | 6/1990 | Brown ................................... 210/85 |
| 5,683,588 | 11/1997 | Pomeink et al. ...................... 210/698 |
| 5,685,994 | 11/1997 | Johnson ................................ 210/748 |

FOREIGN PATENT DOCUMENTS

| | | |
|---|---|---|
| 0 128 782 | 12/1984 | European Pat. Off. . |
| 0 329 562 | 8/1989 | European Pat. Off. . |
| 8 503 310 | 6/1987 | Netherlands . |
| 1426017 | 2/1976 | United Kingdom . |
| 90 05799 | 5/1990 | WIPO . |

*Primary Examiner*—Peter A. Hruskoci
*Attorney, Agent, or Firm*—Lowe Hauptman Gopstein Gilman & Berner

[57] ABSTRACT

An ion supply unit for a water system which is to have its contents purified includes a tank fed from a main water supply and an electrolytic ion generator including silver alloy electrodes. A pump circulates water from the tank through the ion generator and back into the tank at a rate of at least 1 L/s to gradually ionize the contents of the tank and generate a concentrate of silver-ion-laden water. An injector feeds the concentrate into the water system as required.

5 Claims, 1 Drawing Sheet

WATER PURIFICATION SYSTEMS

This application is a 371 of PCT/GB96/00641 filed Mar. 15, 1996.

The present invention relates to water purification systems.

Water supplied by public utilities is normally treated to reduce the micro-organism content to safe levels. However, in many water-using systems, it is possible for micro-organisms to grow. Among the conditions which favour this are the maintenance of water in static form (so that micro-organisms can build up), warmth, light. and the possibility of the accumulation of contaminents on which the micro-organisms can feed.

The control of such micro-organisms in water is therefore often of major importance. In swimming pools, the control of algae is required for both safety and esthetic reasons, in air conditioning systems, the control of bacteria such as Legionella pneumophile is a well-known requirement; and in commercial and industrial water systems (and especially in hospitals and similar establishments) which distribute water for cooking, drinking, and/or washing purposes, there is also often a need for active control of micro-organisms.

Various techniques for water purification in such systems are known.

One known technique consists of the introduction of suitable metal ions into the water. In particular, silver ions are an effective bactericide and copper ions are on effective fungicide. Suitable ion concentrations are typically in the region of 0.01 to 1 ppm (parts per million). The technique is sometimes termed electronic water purification, as such ions can be introduced into the water electrolytically, by using anodes of silver and copper. This is typically achieved by recirculating the water to be treated through a chamber containing the anodes, though in some situations the water may be treated as it is introduced into the system.

This technique has certain advantages over other techniques such as the addition of chemical biocidal compounds. In suitable circumstances the metal ions are maintained indefinitely in the water until an organic mass such as bacteria and algae absorbs them, and their concentration is normally low. However, this technique suffers from various disadvantages, since it is dependent on a variety of factors which influence the efficiency of ion production. These factors include the chemical make-up of the water, its pH, the levels of other metals present, the presence of any organic matter, and any chemical reactions that have taken place. All of these can have a considerable effect on the measurable results. Some will affect ion production rate dissimilarly for the different metals (eg silver and copper) of the anodes. Others will cause chemical conversion, drop-out of ions, or absorption of the metals.

Considering some of these matters in more detail, if the circulation over the anodes is not sufficient, released hydrogen may not be cleared; this may result in the formation of gas pockets in the chamber, and there are potential formations of chemical combinations on the anodes which inhibit ion release. In hard water areas, scale tends to build up on the anodes, inhibiting ion release. With very hard water, such as in a poorly maintained swimming pool, the hardness may also, in combination with high pH (high alkalinity) causing over-saturation of the water, result in the copper falling from its ionic state. Also, if chlorine is present in the water, especially at the levels accepted as good practice in swimming pools, copper chloride and other salts can build on the anodes; this is noticeable on the non-ionizing faces of the anodes, especially when the circulation rate is low. The water temperature also effects the contact time for silver ions to kill bacteria; in hard water the kill time for Legionella pneumophila is reduced by 60% for a temperature rise from 20° C. to 39° C.

In addition, the efficacy of the metal ions depends on a variety of factors. Thus the hardness (level of calcium) in the water affects the time taken to kill micro-organisms; for hardness in the range 0–400 ppm, the time for a 99.9% kill increases by about 200 g for each 10 ppm increase in hardness at 20° C., pH 7.0. For chlorine, 10 ppm of chloride increases the contact time for a 99.9% kill by 25% and 100 ppm increases the kill time by 70%. (However, the presence of phosphates has no appreciable effect on performance of silver as a bactericide)

A further problem is that the rate of ion production is dependent on the conductivity of the water. Pure water is non-conductive, hence ions cannot be produced in it by this means. Increases in water conductivity between the anodes will obviously increase the ion production for a given current applied to the anodes. If control is by a simple potentiometer, set for the application, then any chances in conductivity of the water due to take-up of contaminants will increase the ion production. Some electronic water purifiers have a built-in mechanism to compensate for this; however, this increases their complexity, and the probes used for this control may malfunction due to fouling. Also, the rate of generation of the ions is critical in applications where there is a limit to the effect of the ions on substances in contact with the ionized water.

In the common form of electronic water purification using a recirculating system, any or all of the above may detract from the efficacy of the process. The conditions at start-up cannot be maintained for long periods and it is not a simple matter to determine the frequency of anode cleaning necessary to combat the fall-off of performance. Also, determining the setting for the potentiometer is by trial and error. The usage often changes rapidly and there are often long spells of no through-put, eg in a domestic water system, or the load may undergo large and irregular changes, eg in a swimming pool where the bathing load may change considerably from day to day.

The general object of the present invention is to provide an improved electronic water purification technique.

The crux of the present invention is the provision of an ion supply unit which is fed directly from the mains supply to the water system to be controlled (ie to have its contents purified) and which generates ion-laden water (concentrate) which is then injected into the water system as required. The ion supply unit preferably comprises a tank, an ioniser, and a pump coupied to circulate water from the tank through the ioniser and back into the tank. The concentrate is infected into the water system either as water is drawn from that system or at suitable intervals as water is circulated in that system. The water system will normally use water (ie have water drawn from it or lose water through wastage, evaporation, etc) at a sufficient rate that it will require replenishment at a rate which can incorporate the required amount of concentrate; however, in extreme cases it may be necessary to drain off a small amount of water therefrom to allow the required addition of concentrate.

In the present system, the ion supply unit is isolated from the water system, ie it is esentially "upstream" of the water system. The ion supply unit is therefore unaffected by any problems associated with the recirculation of water, such as the concentration of calcium or chlorides discussed above.

The present process is particularly suitable for applications where temperature, tolerance levels, dose rate, and ion distribution may cause problem in controlling bacteria, algae and fungi when using traditional ion application techniques.

In an alternative form of the present system, the ion supply unit comprises a reservoir which can be refilled with concentrate generated at and supplied from a central station. Preferably such concentrate is stabilized by acidifying it to a suitable degree. A convenient acid to use for this purpose is citric acid, and a suitable pH is around 5.5; however, other acids can be used if desired.

Figure 2:
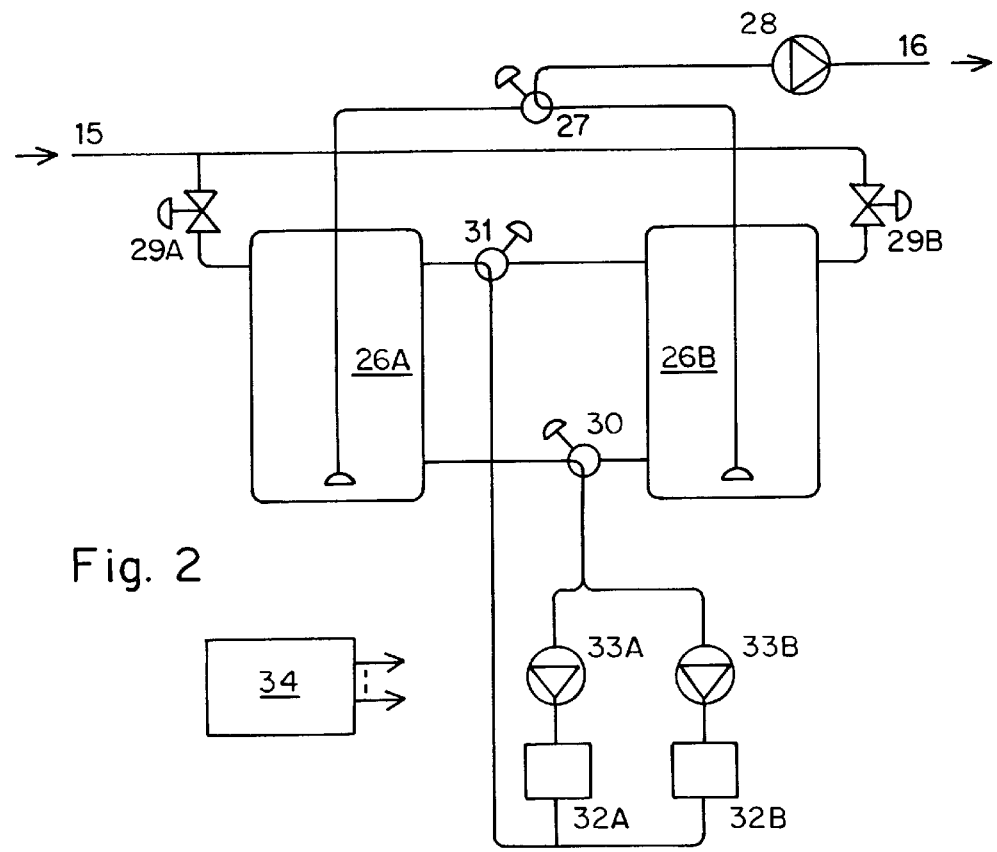

A water purification system embodying the invention, and various modifications thereof, will now be described, by way of example, with reference to the drawings, in which:

FIG. 1 is a general block diagram of a swimming pool; and FIG. 2 is a block diagram of the water purification system therefor.

Referring to FIG. 1, a swimming pool 10 has a water control housing 11 which contains a recirculating pump 12, a filter 13, and a filler valve 14 connected to a main water supply 15. The pump 12 draws water from the pool 10 and passes it through the filter 13 which cleans it end returns it via an outlet pipe 16 to the pool. Any loss of water from the pool is replaced by fresh water from the main 15 under the control of the valve 14. A further valve 17 in the output from the pump 12 allows the water to be diverted to a waste outlet 18 if the pool in to be emptied. These components are all conventional.

In addition, the housing 11 contains an ion supply unit 25, which is coupled to the mains supply line 15 and the water return pipe 16. This unit is operated a suitable intervals, eg daily, to inject concentrete into the pool water. The point of injection is immediately before any chemical biocide (such as chlorine) is injected, but must be after the main filter 13.

FIG. 2 shows the main components of the ion supply unit 25, which consists of a fully dual system. There is a pair of tanks 26A and 26B, each in turn operating as a concentrate source while the other operates as a concentrate generator. The tanks should each be large enough to hold sufficient concentrate of ionized water for a full working day's operation, eg for a swimming pool in use over 12 hours per day.

Suppose that tank 26A has been operated am a concentrate generator and contains concentrate with the required concentration of ions. At the appropriate time in the operation of the pool 10, a valve 27 is set to select tank 26A and a pump 28 draws the concentrate from that tank for injection into the pool water via pipe 16. When this process has been completed, tank 26A is recharged. For this, it is refilled to the top operating level from the main supply 15 via an input control valve 29A. When the level reaches a top sensor the filling valve closes and the recharging of the concentrate commences. For this, its contents are circulated through an ionizer 32A by means of a pump 33A, these units being coupled to the tank 26A by means of suitable settings of two control valves 30 and 31. When the desired ion level is reached the ionizer is shut down.

The charging period must be sufficient to provide the ion requirement for a selected period, for example, for a full working day for a larger swimming pool.

Tank 26B is operated in the same way as a concentrate generator when tank 26A is acting as a concentrate dispenser and as a concentrate dispenser when tank 26A is acting as a concentrate generator. A continuous water treatment by injection of the ion concentrate can thus be achieved.

The pump and ionizer pair 32B–33B are normally used with the tank 26B. However, either of the pump and ionizer pairs, 32A–33A and 32B–33B can obviously be used with either of the tanks 26A end 26B. A single pump and ionizer could of course be used for both tanks; the provision of two pumps and ionizers gives a degree of redundancy and allows either pump or ionizer to be taken out of use, eg for servicing, without affecting the operation of the system.

The ion supply unit includes an electrical control unit 34 which controls the ion dosage rate to the water to be treated. The dosage rate and ion production unit are preferably integrated at the factory, eliminating the need for specialist involvement in installation at site. The control unit is preferably settable to have up to 10 settings of concentrations, depending on the application. A flow indicator, selected concentration display, pulse display and many other options can be incorporated.

The valves and pumps can be operated manually or controlled automatically, and if they are operated automatically, they may be electrically or hydraulically controlled by the control unit 34. Automatic control eliminates the need for operator attendance at possibly inconvenient hours, and the danger of incompetent adjustment of the various controls (valves, pumps, etc). If appropriate, explosion-proof solenoids may be used which can be safely operated in hazardous environments.

The injection rate may be determined by checking the copper level in the pool, eg by a simple Lovibond or similar test. Once the injection rate has been set to achieve the required level, the only adjustment normally necessary is to increase the rate marginally before a heavy bathing load is anticipated and to reset it after the pool returns to normal usage.

For a swimming pool, suitable ion levels may be around 1 ppm for copper and 0.1 ppm for silver. For a pool of 700,000 L, a convenient size for the tanks 26A and 26B is 250 L, and a suitable ion level in the concentrate may be around 50 ppm for copper and 5 ppm for silver. The circulation rate through the ionisers 33A and 33B should be greeter then about 1 L/s, to avoid build-up of silver oxides on the anodes, the anodes may consist of an alloy of 90% copper, 10% silver. (The anode composition will normally be chosen to fit the intended purpose of the system. For purifying drinking water, the copper/silver ratio may be reduced to say 70:30; for other purposes, the copper may for example be replaced by zinc, and the silver/zinc ration may be 80:20.)

If desired, each ioniser may contain two separate electrodes of different compositions, so that by varying the currents fed to the electrodes, the concentrations of the different ions may be controlled independently. Alternatively, each ioniser may comprise two sub-ionisers connected in series and having electrodes of different compositions. One electrode or sub-ioniser may be used as the main electrode, with the other being brought into operation as well when required.

For a swimming pool, the injection of concentrate will normally be carried out in the hours when the pool is in use. Thus the control unit (timer) may be set to commence injection of ions into the pool recirculation system 1 hour before the bathing load is anticipated, to ensure the pool is sufficiently treated injection may continue through the period of use, ending eg 1 hour after the pool is closed for the day. It is desirable to generate the concentrate a reasonably short time before it is required for use (injection into the water system.

If the tank contents fall to a level which trips a low sensor before the timer has shut off the injection pump, the injection is interrupted and the refill and charging commences. An alarm system can be incorporated to warn staff that the tank has emptied earlier than anticipated and that the cause needs to be investigated.

Obviously this simple process can be applied in other situations where continuous dosing is not necessary. With suitable changes to the control procedure, this system can of course also be used to provide a potentially continuous dosing.

Instead of the double tank system described, a single tank system can be used if desired. This will not be as flexible as a double tank system, but will obviously be cheaper. The level in the tank will fall over the injection period, but the tank should not be allowed to empty completely. For a swimming pool, the tank will need to be topped up and recharged after the pool has closed for the day, ready for the next day's use (injection of concentrate). The single tank system has application in any water treatment process where there is a "quiet" period permitting recharging time.

The swimming pool applications discussed above are essentially batch-operated systems. There are also applications where a close and more continuous control of injection is necessary, for example in irrigation systems or domestic, commercial and industrial water systems supplied from a mains-fed break tank. In these, the ion levels must be maintained within close tolerances.

For this, the ion injection pump (ie the pump which controls the injection of the concentrate into the water system) is controlled by a pulse meter controller. The flow of water to be treated controls the input of concentrate via a flowmeter which sends a signal to the pulse meter which in turn controls the injection rate. For some applications the injection pump may be electrically driven, but for most requirements a hydraulic diaphragm injection pump can be used with the hydraulic operating pressure being supplied from the pressure of the water to be treated.

The ion injection pump preferably has plurality of possible settings. Once the system has met up and the dosing rate (pump setting) determined, the system is then automatic. If the flow rate in eg an irrigation or similar system increases or decreases, then the pulse controller adjusts the dosing rate to maintain the correction injection.

On commissioning a system, or where an additional input of ions is necessary, the pulse controller can be set to a higher point to rapidly charge up the water being treated, then reset to normal.

Where the system is applied to a break-tank water system, the flow meter is positioned after the booster pumps so that when these operate the flow initiates the injection of concentrate into the discharge pipe after the flow meter. In such a system a small bleed of the Ionized water is preferably led directly from the injection tubing to the ball valve end of the break tank to provide some degree of purification of the water in the tank. For a drinking water system, it may be convenient to set the injection rate to about 1% (of concentrate to the total volume of water flowing through the system).

The process is set up to ensure that sufficient ions are available at all water outlets, tops, showers, sprinklers etc to combat Legionella and to deal with any seepage from dead-legs. Part of the commissioning of domestic water systems involves pulling ionized water for several minutes through all such outlet. The increase of the injection rate to the highest setting during this phase assists in cleaning up the system. Similarly, if for any reason the bacteria levels are found to be high at any time, the system can be set to a high injection rate by adjusting the pulse controller. Other methods of ionization cannot respond rapidly if and when required.

The present system reduces or eliminates the difficulty of making installations in cramped environments. The size of the concentrate tank(s) can be adjusted, with a wide range, in dependence on the amount of space available, with the ion concentration in the concentrate being adjusted accordingly. Thus in an extreme situation such as on a ship, the concentrate tank may be extremely small (eg 1.5 L), with the ion concentration being say 500 times that used for a swimming pool.

Copper levels are commonly used to determine the presence of ions in the treated water. However, if the present water purification system is applied to a domestic hot and cold water system, a silver monitoring unit may be included to ensure that silver level never falls below ineffective bactericidal levels or exceeds water drinking standards where applicable. The use of a silver monitoring unit is valuable where the water being treated is aggressive and may leach copper from copper pipes, as this can give false readings copper level readings.

Silver level monitoring is also of particular value to Legionella-sensitive premises, such as hospitals where immuno-depressed patients reside. In such systems, the silver level may also be depleted by the killing of residual bacteria, which would also result in the silver level deviating from the normally corresponding copper level.

The silver monitor can conveniently be positioned in a loop from the flow chosen as the most suitable point for monitoring (for example, in a hot water circulating system close to the return to the calorifier). The unit consists of a cell through which a part of the treated water passes at about 1.5 litres/minute. The control unit adjusts the sliver level in the concentrate appropriately, raising it if the level detected by the monitor is low. If the silver level detected by the monitor is high, the the concentrate injection may be interrupted or terminated.

The silver level may be sampled periodically, with the sample water being dumped after the test. The period between tests can be varied. An alarm can be arranged in the system to operate if the silver level falls below a predetermined level.

With silver level monitoring, there is no need for chemical biocides in addition. In water heating systems, there is also no need to maintain water temperature at 60° at the calorifier to eradicate Legionella. The assurance of the presence of silver at the levels presented in the treated water will permit hot water systems to be operated at energy-saving level of 43 to 45° C. safely.

In the present system, the ion production in the ion supply unit is at a high level. This enables the system to respond rapidly if the ion level in the water system needs to be raised. In contrast, in standard recirculating systems ion production is normally only required to work at approximately half the designed output, so that such systems are thus over-designed for normal operation. Such systems are slow to meet any special needs by raising the ion production rate.

If there are several water systems to be purified, they can be coupled to a common ion supply unit, with each coupling determining the dosage rate for its water system. For example, in a 3-pool swimming pool complex with separate circulating systems for each pool, the charged tank can be run down to 3 day-tanks, each with its own injection system. The same could apply for a number of cooling towers where one control concentrate system provides the daily fill for the separate towers.

The present system (including its variants) is usable in many different applications. The flexibility of the system will cover most requirements in commerce, industry, agriculture, and horticulture. Multiple units can be arranged where necessary, or the concentrate level or charging tank sizes can be altered to suit. The types and levels of ions will be chosen to suit the particular application. Thus the ion level will normally be kept very much higher in a cooling tower system than in a swimming pool or drinking water system. For certain agricultural, horticultural, and similar applications, the ions injected into the system may include ions chosen for their beneficial effects on the plants or animals utilizing the water.

The present system is also easily maintained The anodes in the ionizers should be checked visually at intervals of the order of every two weeks: if fouling is observed, the pump should be isolated the anode chamber cover removed, and the anodes wire brushed to remove deposits and turned to even the wear. The anodes will also require replacement at intervals, typically of the order of 1½ to 2 years. Sediment may accumulate on the bottom of the tanks, which should be checked at intervals of the order of every two weeks and drained and wash through with mains water as necessary. The double tank units can be maintained without interruption of injection by carrying out the routine before the empty tank is filled.

In a modification of this system, concentrate can be generated at a central station end then transported to operating stations in suitable containers and used to fill tanks at those stations which ore then used to feed the concentrate into the water systems to be purified. For this, we have found it useful to stabilize the concentrate by acidifying it to a suitable degree. A convenient acid to use for this purpose is citric acid, since that is a natural acid which therefore has few or no harmful effects; however, other acids (eg sulphuric or nitric acid) can be used if desired. A suitable pH is 5.5.

We claim:

1. An ion supply unit for a water system which is to have its contents purified, comprising:

a tank arrangement connected to be fed from a main water supply;

an electrolytic ion generator arrangement including silver alloy anodes;

a pump coupled to circulate water from the tank arrangement through the ion generator arrangement and back into the tank arrangement at a rate of at least 1 L/s for gradually ionizing the contents of the tank arrangement and thereby generating a concentrate of silver-ion-laden water and avoid silver oxide buildup on said anodes; and an injector arrangement coupled with the tank arrangement for injecting the concentrate into the water system as required.

2. The ion supply unit of claim 1 wherein the tank arrangement includes a pair of tanks connected in parallel and arranged for alternate operation.

3. The ion supply unit of claim 2 wherein the generator arrangement includes a pair of electrolytic ion generators connected in parallel and arranged for alternate operation.

4. The ion supply unit of claim 1 wherein the generator arrangement includes a pair of electrolytic ion generators connected in parallel and arranged for alternate operation.

5. A method of supplying ions to a water system which is to have its contents purified, comprising:

feeding water from a main water supply to a tank;

circulating water at a rate of at least 1 L/s from the tank through an electrolytic ion generator including silver alloy anodes and back into the tank to gradually ionize the contents of the tank and thereby generate a concentrate of silver-ion-laden water and avoid silver oxide buildup on said anodes; and injecting the concentrate into the water system as required.

* * * * *